US008835530B2

(12) United States Patent  
Schaefer et al.

(10) Patent No.: US 8,835,530 B2  
(45) Date of Patent: Sep. 16, 2014

(54) UV-CURING GLASS PRINTING INK AND UV-CURING GLASS PRINTING LACQUER AND PROCESS FOR PRINTING GLASS SUBSTRATES

(75) Inventors: Wolfgang Schaefer, Horb (DE); Dimitrios Triantafillidis, Heilbronn (DE)

(73) Assignee: Marabu GmbH & Co., KG, Tamm (DE)

( * ) Notice: Subject to any disclaimer, the term of this patent is extended or adjusted under 35 U.S.C. 154(b) by 292 days.

(21) Appl. No.: 11/649,728

(22) Filed: Jan. 4, 2007

(65) Prior Publication Data

US 2007/0154632 A1    Jul. 5, 2007

(30) Foreign Application Priority Data

Jan. 5, 2006    (DE) .................... 10 2006 000 867

(51) Int. Cl.  
*C09D 11/10* (2014.01)  
*C09D 11/02* (2014.01)  
*C08J 3/28* (2006.01)  
*C08F 2/46* (2006.01)  
*C08F 2/50* (2006.01)

(52) U.S. Cl.  
USPC ............. 523/160; 522/74; 522/77; 522/78; 522/79; 522/80; 522/83; 522/100; 522/103; 522/104; 522/107; 522/109; 522/110; 522/112; 522/111; 522/113; 522/120; 522/121; 522/168; 522/170; 522/151; 522/178; 522/173; 522/181; 522/182; 522/902

(58) Field of Classification Search  
USPC ............ 522/74, 80, 85, 170, 109, 110, 111, 522/112, 113, 114, 120, 121, 100, 168, 83, 522/77, 78, 79, 104, 107, 151, 173, 178, 522/181, 182, 908; 523/160, 161  
See application file for complete search history.

(56) References Cited

U.S. PATENT DOCUMENTS

| | | | | |
|---|---|---|---|---|
| 3,551,235 A | * | 12/1970 | Bassemir et al. | 156/99 |
| 3,551,246 A | * | 12/1970 | Bassemir et al. | 428/211.1 |
| 3,551,311 A | * | 12/1970 | Nass et al. | 428/458 |
| 3,558,387 A | * | 1/1971 | Bassimer et al. | 156/99 |
| 4,104,143 A | * | 8/1978 | Wasilewski et al. | 522/137 |
| 4,104,413 A | * | 8/1978 | Wynn et al. | 426/582 |
| 5,118,567 A | | 6/1992 | Komiyama | |
| 5,346,933 A | | 9/1994 | Knell | |
| 5,411,768 A | * | 5/1995 | Knell et al. | 427/386 |
| 5,476,748 A | | 12/1995 | Steinmann | |
| 5,476,752 A | | 12/1995 | Noguchi | |
| 5,656,336 A | | 8/1997 | Kamen et al. | |
| 6,232,361 B1 | * | 5/2001 | Laksin et al. | 522/84 |
| 6,413,696 B1 | | 7/2002 | Pang | |
| 6,485,885 B1 | | 11/2002 | Oka et al. | |
| 6,513,435 B2 | | 2/2003 | Detzner | |
| 6,562,172 B1 | * | 5/2003 | Kamen et al. | 156/234 |
| 2002/0104456 A1 | * | 8/2002 | Detzner | 101/483 |
| 2007/0149667 A1 | | 6/2007 | Xu | |
| 2007/0213427 A1 | * | 9/2007 | Lehmann et al. | 523/160 |

FOREIGN PATENT DOCUMENTS

| | | |
|---|---|---|
| DE | 2 343 589 A1 | 3/1974 |
| DE | 100 19 926 A1 | 10/2001 |
| DE | 10019926 | 10/2001 |
| EP | 1 086 403 B1 | 3/2001 |
| GB | 1 159 404 A | 7/1969 |
| GB | 2 029 433 A | 3/1980 |
| WO | WO 9851746 A1 * | 11/1998 |
| WO | 99/06336 | 2/1999 |
| WO | WO99/06336 | 2/1999 |
| WO | 99/36482 A | 7/1999 |
| WO | 2004/035643 A1 | 4/2004 |
| WO | WO 2005040055 A1 * | 5/2005 |

OTHER PUBLICATIONS

Sartomer. Product Bullet: Epoxy Acrylate Oligomers. ISO-9001-2000 (Jul. 2005). [Online]. [Retrived on Jun. 5, 2011]. Retrived From the Internet<URL:: http://www.sartomer.com/TechLit/3400.pdf>.*  
Notice of Opposition of EP Pat. No. 1 675 806, mailed Jun. 20, 2013.  
D8 from Opposition: Formulation of inks, (Apr. 13, 1998).  
D9 from Opposition: Invoice History, Dec. 6, 2013.  
D10 from Opposition: Letter from Mr. Brian Breidigan, (Jun. 11, 2013).  
D11 from Opposition: Inks & Solvents Catalog, (Feb. 2001).  
D12 from Opposition: "What's New" Ceramics Industry, (Feb. 1999).  
D13 from Opposition: Letter Mr. Jonathan Sexton, (Dec. 6, 2013).  
D14 from Opposition: Invoices, (Jan. 15, 2001).  
D15 from Opposition: Invoices, (Mar. 1, 2001).  
D16 from Opposition: Chemical Formulation, (Feb. 25, 2001).  
D17 from Opposition: Chemical Formulation, (Aug. 30, 2001).

* cited by examiner

*Primary Examiner* — Sanza McClendon  
(74) *Attorney, Agent, or Firm* — Greer, Burns & Crain, Ltd.

(57) ABSTRACT

A glass printing ink and glass printing lacquer are prepared, which contain at least one photoinitiator, at least one resin and at least one additional substance. The resin is an epoxy resin based on bisphenol A, diluted in a UV-curing monomer, or a resin with functional groups containing free functional amino, hydroxy, epoxy, acid, acid anhydride and/or acrylate groups, or a combination of the epoxy resin with the resin with functional groups. The at least one additional substance is a wax. The use of the glass printing ink and glass printing lacquer in printing a glass substrate and processes for the printing of a glass substrate are also described.

12 Claims, No Drawings

UV-CURING GLASS PRINTING INK AND UV-CURING GLASS PRINTING LACQUER AND PROCESS FOR PRINTING GLASS SUBSTRATES

RELATED APPLICATIONS

The present invention claims the benefit of the filing date of German Patent Application, Serial No. 10 2006 000 867.7, filed Jan. 5, 2006; and is further related to U.S. patent application Ser. No. 10/576,706, filed Apr. 20, 2006, the contents of which are incorporated by reference herein.

TECHNICAL FIELD

The present invention relates to a UV-curing glass printing ink and a UV-curing glass printing lacquer, the use of the UV-curing glass printing ink and UV-curing glass printing lacquer for the printing of glass substrates, and a process for printing glass substrates with such a printing ink.

BACKGROUND OF THE INVENTION

There has recently been increasing use of UV-curing organic glass printing inks, which have to be post-treated with heat after curing, instead of the ceramic (inorganic) inks previously used, for the printing of glass. This opens up the possibility of managing without heavy metals, having access to a wider range of colours (standard and mixed shades) and achieving greater brilliance and a higher degree of gloss. Another advantage is the possibility of evaluating the shade immediately after UV curing. In contrast, with inorganic inks evaluation is only possible after stoving. Furthermore, they offer process advantages such as a more rapid tempering process (e.g. approx. 20 min compared with 90 min tempering) and a reduced tempering temperature (e.g. 160° C. compared with 500-700° C.), which reduces the process costs compared with processes using inorganic glass printing inks. However, the organic printing inks themselves are more expensive than conventional inorganic inks for printing glass.

The milder process conditions in the printing process using organic glass printing inks ensure that the internal pressure resistance of bottles is not impaired. For the printing of glass that has to be post-treated at high temperatures, such as formed glass for cars or glass with high-gloss gold printing, however, the organic glass printing inks are unsuitable.

With the organic printing inks for glass currently available, the mechanical resistance, opacity and water resistance can present problems, with possible difficulties particularly in obtaining adequate scratch resistance.

The organic printing inks for glass are printed after a pre-treatment of the glass, e.g. by flaming, in a two-component printing process, i.e. with an adhesion promoter that has to be mixed into the printing ink, and are then post-tempered at temperatures of e.g. 140°-200° C. over a specific period.

It would be desirable to simplify this printing process, thus saving costs. One way of simplifying it would be to remove the need to print with two components, i.e. to use an adhesion promoter. Another would consist in rendering a post-tempering superfluous.

WO 99/06336 discloses a process for printing glass in which a glass ink comprising a bisphenol A epoxy resin is printed on to a glass substrate and then cured by radiation, with the optional use of an adhesion promoter.

However, the inventor has found that a glass printing ink of this type and a process of this type does not, without additional measures, provide adequate scratch resistance and also fails to provide adequate adhesion of the glass ink to the glass substrate and adequate water resistance. Accordingly, in all the examples in WO 99/06336, both an adhesion promoter is used and post-tempering is performed at a temperature of 150 to 200° C. U.S. Pat. No. 5,656,336 A discloses a similar process, which also suffers from the same deficiencies.

The present invention is directed to resolving these and other matters.

SUMMARY OF THE INVENTION

An object of the present invention includes providing a glass printing ink and a glass printing lacquer that guarantee adequate scratch resistance and adhesion without post-tempering. In addition, a use of the glass printing ink and glass printing lacquer in the printing of glass substrates and an associated printing process are to be provided.

These objects are achieved by: (1) a glass printing ink or glass printing lacquer including at least one resin, at least one photoinitiator, and at least one additional substance, wherein the resin is an epoxy resin based on bisphenol A, diluted in a UV-curing monomer, or a resin with functional groups including free functional amino, hydroxy, epoxy, acid, acid anhydride and/or acrylate groups, or a combination of the epoxy resin with the resin with free functional groups, and the at least one additional substance is a wax; (2) using such glass printing ink or glass printing lacquer described above for the printing of a glass substrate or a substrate that is glass-like at least on its surface; (3) a printing process for the printing of a glass substrate or a substrate that is glass-like at least on its surface, with a glass printing ink or glass printing lacquer described above, and optionally pre-treating the glass or glass-like substrate, printing the glass or glass-like substrate with a glass printing ink or glass printing lacquer, an adhesion promoter being mixed into the glass printing ink or glass printing lacquer before printing, and curing the glass printing ink or glass printing lacquer with UV radiation, wherein no subsequent tempering being performed; and (4) printing the glass or glass-like substrate with the glass printing ink or glass printing lacquer described above, without the use of an adhesion promoter, curing the glass printing ink or glass printing lacquer with UV radiation, and optionally post-tempering the printed glass or glass-like substrate at a temperature of substantially 130° C. to 170° C. for substantially 20 to 40 minutes.

An important advantage of the invention, in addition to the mechanical properties of the cured ink film or lacquer film, is that a simplification of the process is obtained in that, both with one-component systems and with two-component systems, the desired mechanical properties are achieved without post-tempering. More-over, in most cases good resistance to moisture and water is obtained.

DETAILED DESCRIPTION OF THE PRESENT INVENTION

While this invention is susceptible of embodiment in many different forms, there is shown in the examples and will herein be described in detail one or more embodiments with the understanding that the present disclosure is to be considered as an exemplification of the principles of the invention and is not intended to limit the invention to the embodiments illustrated.

The terms glass printing ink and glass printing lacquer are understood to mean a printing ink and printing lacquer suitable for the printing of glass and glass-like surfaces, such as ceramics and tiles.

The glass printing ink and glass printing lacquer according to the invention contain a wax. The inventor has found that, by using a wax, the scratch resistance, i.e. the mechanical resistance, of the glass printing ink and glass printing lacquer can be significantly increased compared with known inks and lacquers.

Suitable waxes are commercially available. Particularly suitable are the waxes listed below, with commercially available products being mentioned by way of example for the respective waxes; the respective supplier is given in brackets:

Polyethylene Waxes:
Ceraflour 990 (Byk-Cera, Danzigweg 23, 7418 EN Deventer, Netherlands)
Ceraflour 991 (Byk-Cera, Danzigweg 23, 7418 EN Deventer, Netherlands)
Printwax ME 0825 (DEUREX Micro-Technologies GmbH, Dr. Bergius Strasse 18/20, 06729 Tröglitz, Germany)
Modified Polyethylene Waxes:
Ceraflour 961 (Byk-Cera, Danzigweg 23, 7418 EN Deventer, Netherlands)
Everglide UV961 25% (Krahn-Chemie GmbH, Grimm 10, 20457 Hamburg, Germany)
High Density Polyethylene Waxes
Ceraflour 950 (Byk-Cera, Danzigweg 23, 7418 EN Deventer, Netherlands)
Polymer-silica Composites
Deuteron MM 659 (Deuteron GmbH, in den Ellern 2, 28832 Achim, Germany)
Micronised Polyolefin Waxes
Micro Wax DM(Finma-Chemie GmbH, Theodor-Heuss-Straße 5, 61191 Rosbach, Germany)
Micro Wax HTDM (Finma-Chemie GmbH, Theodor-Heuss-Straße 5, 61191 Rosbach, Germany)
Fischer-Tropsch Waxes
Ceraflour 940 (Byk-Cera, Danzigweg 23, 7418 EN Deventer, Netherlands)
Micronised Polytetrafluoroethylene Waxes
Ceraflour 980 (Byk-Cera, Danzigweg 23, 7418 EN Deventer, Netherlands)
Ultraglide UV 701 (Krahn-Chemie GmbH, Grimm 10, 20457 Hamburg, Germany)
Shamrock SST-3 (Shamrock, Heesterveldweg 21, 3700 Tongeren, Belgium)
Micronised Polytetrafluoroethylene/polyethylene Waxes
Ceraflour 968 (Byk-Cera, Danzigweg 23, 7418 EN Deventer, Netherlands)
Ceraflour 996 (Byk-Cera, Danzigweg 23, 7418 EN Deventer, Netherlands)
Amide Waxes
Ceraflour 994 (Byk-Cera, Danzigweg 23, 7418 EN Deventer, Netherlands)
Deurex MA 7020 ((DEUREX Micro-Technologies GmbH, Dr. Bergius Strasse 18/20, 06729 Tröglitz, Germany)
Carnauba Waxes
Ceraflour 4RC 1165 (Byk-Cera, Danzigweg 23, 7418 EN Deventer, Netherlands)
Everglide UV 636 25% (Krahn-Chemie GmbH, Grimm 10, 20457 Hamburg, Germany)
Montan Waxes
Deurex MM 8120 ((DEUREX Micro-Technologies GmbH, Dr. Bergius Strasse 18/20, 06729 Tröglitz, Germany)
Deurex MM 8200 (DEUREX Micro-Technologies GmbH, Dr. Bergius Strasse 18/20, 06729 Tröglitz, Germany)
Micronised Ester Waxes With UV-reactive Groups
Ceridust TP 5091 (Clariant GmbH, Am Unisyspark 1, 65843 Sulzbach, Germany)
Paraffin Waxes
Polysperse HP (Eastman Chemical Deutschland GmbH, Charlottenstraße 61, 51149 Cologne, Germany)
Polypropylene Waxes
Crayvallack WN-1135 (Lubrizol Coating Additives GmbH, Max-Planck Straße 6, 27721 Ritterhude, Germany)
Spray-micronised Polyolefin Waxes
Printwax MXF 9510 D ((DEUREX Micro-Technologies GmbH, Dr. Bergius Strasse 18/20, 06729 Tröglitz, Germany)
Printwax MX 9815 (DEUREX Micro-Technologies GmbH, Dr. Bergius Strasse 18/20, 06729 Tröglitz, Germany)

The concentration of the wax is preferably 0.1 wt. % to 10 wt. %, more preferably 0.5 wt. % to 5.0 wt. % and particularly preferably 1.0 wt. % to 3.0 wt. % dry weight, based on the weight of the glass printing ink or glass printing lacquer.

The wax is preferably dispersed in the glass printing ink or glass printing lacquer by means of a stirrer, high-speed mixer or triple roll or bead mill, without being limited to these processes.

The glass printing ink and glass printing lacquer according to the invention contain as a possible resin component an epoxy resin based on bisphenol A, which preferably has a molecular weight in the range of 700 to 1500 (weight average). Epoxy resins of this type are commercially available. Particularly preferred examples are Rütapox resin 0194 from Bakelite AG; ARALDITE® GT 7072 from Vantico AG, K-401.1.32, CH-4002 Basel and Epikote 1055 from Brenntag.

The epoxy resin used according to the invention is dissolved in a monomer, which is UV-curing, e.g. based on acrylate groups suitable for polymerisation. This monomer is preferably mono-, di- or higher polyacrylates or polymethacrylates, such as e.g. isobornyl acrylate, 2-phenylethyl acrylate, 2-(2-ethoxyethoxy)ethyl acrylate (EOEOEA), 1,6-hexanediol diacrylate (HDDA), dipropylene glycol diacrylate (DPGDA), neopentyl glycol diacrylate, dipentaerythritol hexaacrylate (DPHA), propoxylated glycerol triacrylate (GPTA), tripropylene glycol diacrylate (TPGDA), dipentaerythritol pentaacrylate (DiPEPA), pentaerythritol triacrylate (PETIA), ethoxylated trimethylpropane triacrylate (TM-PEOTA), dipentaerythritol acrylate (DPHA), tricyclodecanedimethanol diacrylate (TCDDMDA), hydroxypropyl methacrylate (HPMA). 1,6-Hexanediol diacrylate is especially preferred.

The concentration of the epoxy resin in the monomer is preferably 10 to 90 wt. %, preferably 30 to 70 wt. %, especially preferably 50 wt. %, based on the mixture.

The concentration of the epoxy in the glass printing ink and glass printing lacquer according to the invention is generally 1 to 90 wt. % dry weight, based on the total mass of the glass printing ink or glass printing lacquer, and is preferably 5 to 20 wt. %, particularly preferably 11 to 14 wt. % dry weight.

Alternatively, the glass printing ink and glass printing lacquer according to the invention contain a resin with functional groups having free functional amino, hydroxy, epoxy, acid, acid anhydride and/or acrylate groups. Melamine acrylate resins (e.g. the silicon dioxide-reinforced NANOCRYL XP 21/0793 from Hanse Chemie (hanse chemie GmbH, Charlottenburgerstrasse 9, D-21502 Geesthacht, Germany) or the multifunctional melamine acrylate ACTILANE 890 from Akzo Nobel Resins (Akzo Nobel Resins bv, Verkaufsbüro Deutschland, Industriestrasse 8, P.O. Box 100265, D-46422 Emmerich); Viaktin VTE 5967 from Cytec Surface Specialities, Anderlechtstr. 33, B-1620 Drogenbos, and an acid-modified polyester acrylate (e.g. GENOMER* 7154 from Rahn, Dörflistrasse 120, Zurich, Switzerland; Ebecryl 770 from Cytec Surface Specialities) have proved particularly suitable. Other suitable resins for the combination are certain polyester resins (e.g. Roskydal UA XP 2416 from Bayer, Ebecryl 524 from Cytec Surface Specialities) and epoxy acrylates (e.g. Inchemrez UV 93IB50 from In Chem Corp, P.O. Box 69, CH 1170 Aubonne).

The quantity of this resin with functional groups in the glass printing ink or glass printing lacquer can vary to a large degree. The quantity is generally 5 to 90 wt. % dry weight, based on the total mass of the glass printing ink or glass printing lacquer, preferably 5 to 40 wt. %, particularly preferably 10 to 30 wt. %. The resin with functional groups is used to make the glass printing ink or glass printing lacquer more supple and less brittle, and to increase its adhesion and scratch resistance.

Alternatively, the glass printing ink and glass printing lacquer according to the invention contain a combination of the epoxy resin with the resin with functional groups.

Moreover, the glass printing ink and glass printing lacquer according to the invention can also optionally contain additional resins to improve their properties further. These resins can be selected from a wide range of resins, e.g. methyl methacrylate copolymers (e.g. Paraloid B-48N, Paraloid B60, Paraloid B-82 from Rohm & Haas Deutschland GmbH, In der Kron 4, D-60439 Frankfurt; Neocryl B-810 from Neoresins, Lurgiallee, D-60439 Frankfurt/Main; ethyl methacrylate (e.g. Paraloid B 72 from Rohm & Haas); butyl methacrylate copolymers (e.g. Degalan LP 65/12, Degalan LP 68/04 from Röhm GmbH & Co. KG, Kirschenallee, D-64293 Darmstadt); liquid epoxy resins (e.g. Polypox E 064 from UPPC GmbH, Rütapox resin 0164 from Bakelite AG, Araldite GY 250 from Vantico); unsaturated polyester resins (e.g. Haftharz LTH from Degussa Chemiepark Marl, Paul-Baumann-Str. 1, D-45764 Marl); saturated polyester resins (Dynapol L 912, Dynapol L 952 from Degussa)

These additional resins can be present for example in a quantity of 1 to 50 wt. % dry weight, based on the total mass of the glass printing ink or glass printing lacquer, preferably 3 to 10 wt. %.

The glass ink and glass printing lacquer according to the invention contain at least one photoinitiator, usually two and possibly three or more photoinitiators, to initiate the surface curing and in-depth curing (crosslinking) of the glass ink in UV light. They can be selected from the conventional photoinitiators used in UV-curing printing inks and lacquers etc., for example, but not limited to, 1-hydroxycyclohexylacetophenone (Irgacure® 184 from Ciba SPEZIALITÄTENCHEMIE AG; Klybeckstraße 141, Postfach, CH-4002 Basel), 2-methyl-1-[4-(methylthiophenyl)-2-morpholinopropan]-1(Irgacure® 907 from Ciba), 2-benzyl-2-dimethylamino-1-(4-morpholinophenyl)butan-1-one (Irgacure® 369 from Ciba), bis(2,4,6-trimethylbenzoyl)phenylphosphine oxide (Irgacure® 819 from Ciba), 2-hydroxy-2-methyl-1-phenyl- 1-propanone (Darocur® 1173 from Ciba), isopropyl thioxanthone (ITX from Lambson), 2-chlorothioxanthone, (CTX from Lambson), benzophenone, 2,4,6-trimethylbenzenediphenyl phosphine oxide (TPO from BASF), ethyl-2,4,6-trimethylbenzoylphenyl phosphinate (TPO-L from BASF) and methyl-benzoyl formate (MBF from Lambson). The total quantity of photoinitiators is generally 1 to 12 wt. %, preferably 3 to 7 wt. %, based on the total mass of the glass printing ink or glass printing lacquer.

In addition, co-initiators such as amines (e.g. MDEA from BASF, BASF Aktiengesellschaft, Carl-Bosch-Straße 38, D-67056 Ludwigshafen) or amine-modified acrylates (e.g. Ebecryl P 115, Ebecryl 7100 from Cytec Surface Specialities; Actilane 705, Actilane 715, Actilane 755 from Akzo Nobel Resins bv., Verkaufsbüro Deutschland, Industriestraße 8, D-46446 Emmerich; Laromer PO 94 F, Laromer LR 8869 from BASF; Craynor 503, Craynor 550 from Sartomer, Immeuble le Diamant B, F-92970 Paris la Défense; Photomer 4775F from Cognis) can also be contained in quantities of 1 to 5 wt. %, based on the total mass of the glass printing ink or glass printing lacquer.

Pigments can be contained in the glass printing ink according to the invention. These can be any pigments, e.g. titanium dioxide, zinc sulfide, carbon black, azo diaryl yellow, isoindole yellow, diarylide orange, quinacridone magenta, diketo pyrrolo red, copper phthalocyanine blue, copper phthalocyanine green, dioxazine violet and diketo metal oxide. A fairly comprehensive list of other pigments that can be used is to be found in the Colour Index International, Fourth Edition Online, 2001, published by the Society of Dyers and Colourists in conjunction with the American Association of Textile Chemists and Colorists. Special effect pigments, such as metal oxide-coated mica and metallic pigments, can also be used.

The quantity of colour pigment is generally 2 to 50 wt. %, preferably 10 to 35 wt. %, based on the total mass of the glass printing ink, depending on the type of pigment and the desired opacity. White pigment is generally used in a quantity of 20 to 50 wt. %, preferably 30 to 40 wt. %.

The glass printing lacquer generally does not contain any pigment.

In addition to the UV-curing monomer in which the bisphenol A-based epoxy resin is dissolved, further reactive thinner is generally added to the glass printing ink or glass printing lacquer. These reactive thinners, which are also UV-curing, can be the UV-curing monomers mentioned above in connection with the polyester solution. Furthermore, other compounds with a single ethylenically unsaturated bond can also be used, such as e.g. N-vinyl pyrrolidone (NVP) and vinyl caprolactam. The quantities of additional reactive thinner used are generally 0 to 60 wt. %, preferably 3 to 20 wt. %, particularly 4 to 8 wt. %, e.g. 6 to 7 wt. %, based on the total mass of the glass printing ink or glass printing lacquer.

The glass printing ink and glass printing lacquer according to the invention can contain one or more fillers. The nature of the fillers is not particularly critical. They can be selected from conventional fillers used in printing inks, such as for example, but not limited to, china clay, barium sulfate (in precipitated form as blanc fixe), calcium carbonate, zinc sulfide, siliceous earth, talcum, aluminium silicate, aluminium hydrate and/or silica. The quantity of filler used is generally in the range of 0 to 50 wt. %, preferably 10 to 30 wt. %, e.g. 20 wt. %, based on the total mass of the glass printing ink or glass printing lacquer.

A thickener can also be contained in the glass printing ink or glass printing lacquer according to the invention and can also be selected from conventional materials used for this purpose in inks/lacquers. These include, but are not limited to, e.g. pyrogenic silica, laminar silicates and castor oil derivatives. The quantity of thickener used is generally in the range of 0 to 10 wt. %, preferably 1 to 5 wt. % and particularly 1.5 to 3 wt. %, based on the total mass of the glass printing ink, as a function of the type of pigment, or of the glass printing lacquer.

In general, the glass printing ink and glass printing lacquer according to the invention also contain a defoamer and/or a flow control agent, generally in a quantity of 0.5 to 2.5 wt. %, preferably 0.5 to 1.5 and particularly 1 wt. %, based on the total mass of the glass printing ink or glass printing lacquer. Defoamers can be selected e.g. from modified acrylates or modified acrylate copolymers, but also, and preferably, from silicon-containing compounds. Flow control agents include, for example, modified polyacrylates and polysiloxanes.

Genorad 16 from Rahn and Fluorstab UV2 from Kromachem, Park Industrial Centre, Tolpits Lane, Watford, Hertfordshire WD1 8SP, UK, are preferably used as stabilisers.

Before printing, an adhesion promoter can be added to the glass printing ink and glass printing lacquer in a quantity of 0.1 to 20 wt. %, preferably 1 to 10 wt. %, based on the total mass of the glass printing ink or glass printing lacquer. These can be isocyanate adhesion promoters, e.g. aliphatic polyisocyanates, such as hexamethylene diisocyanate (HDI), trimethylhexane diisocyanate (TMHDI), cycloaliphafic polyisocyanates such as isophorone diisocyanate (IPDI), hydrogenated xylylene diisocyanate (HXDI) or diisocyanatodicyclohexylmethane (HMDI), as well as aromatic polyisocyanates, such as toluene diisocyanate (TDI), xylylene diisocyanate (XDI), tetramethylxylylene diisocyanate (TMXDI) or diisocyanatodiphenyl-methane (MDI). Commercially available products are e.g. Desmodur E41 or Desmodur N 75 (Bayer). Polyimides, such as polyethyleneimides or polycarbodiimides, can also be used. The preferred adhesion promoters, however, are silane adhesion promoters, such as alkylsilanes, vinylsilanes, methacryloxysilanes, epoxysilanes, aminosilanes, urea silanes, chlorosilanes and isocyanatosilanes. Especially preferred are aminosilanes, such as gamma-aminopropyltriethoxysilane, gamma-aminopropyltrimethoxysilane, n-beta-(aminoethyl)-gamma-aminopropyltrimethoxysilane, bis(gamma-trimethoxysilylpropyl)amine, N-phenyl-gamma-aminopropyltrimethoxysilane and N-beta-(aminoethyl)-gamma-aminopropylmethyldimethoxysilane and isocyanatosilanes, such as gamma-isocyanatopropyltriethoxysilane.

The objects that can be printed according to the invention include glass, ceramics, tiles and similar objects that are glass-like, at least on the surface. Accordingly, the invention also relates to the use of a glass printing ink or glass printing lacquer for the printing of glass, ceramic, tile and similar substrates that are glass-like, at least on their surface.

Such objects can be present in any shape or form, such as a container, a plate, a tile, a figure, etc. In a preferred embodiment of the invention, the object is a packaging glass (drinks bottles, cosmetic containers) or a domestic glass.

The expression "glass" as used according to the invention is intended to mean glass, ceramics, tiles and similar glass-like materials.

Before being printed, the glass is usually subjected to a pre-treatment. This can be a flame treatment. In the case of a suitable glass, it is also possible to omit the pre-treatment.

A particularly effective pre-treatment is the so-called UVitro process from Isimat, Ringelbacherstrasse 3840, D-73479 Ellwangen. This process is explained in detail in DE 100 19 926 A1 and in U.S. Pat. No. 6,513,435 B2. In a first step, it comprises the treatment of a glass surface with an oxidising flame (i.e. with an oxygen excess), usually for 3 to 4 seconds, and in a second step the treatment with a silicatising flame (i.e. a flame into which a silicon compound, e.g. tetramethoxysilane, is fed), usually also for 3 to 4 seconds.

The glass is then printed. The printing process can, for example, be a screen printing, pad printing, offset printing, flexographic printing or gravure printing process. A screen printing process is preferred.

The curing of the glass printing ink or glass printing lacquer is performed with UV light in a wavelength range of 200 to 400 nm over a time period sufficient to achieve a complete cure. Alternatively, the glass printing ink or glass printing lacquer can also be cured without photoinitiators using electron beams.

The entire colour range can be printed. When printing by means of screen printing, it is preferred to use a 100-40 to 180-27, preferably a 140-34, screen printing fabric, which results in an ink film thickness of 5 to 10 μm. Depending on the printing task and printing machine, curing takes place using conventional medium-pressure mercury lamps, or alternatively gallium-doped or iron-doped lamps with 80-400 W/cm, preferably 120 to 200 W/cm, which are substantially focused. The illumination period is connected to the printing rate, since the printing and illumination devices are connected. Tn the case of bottles, a conventional printing rate is 40-120 prints/min.

After UV curing, a post-tempering step, e.g. at a temperature of 130 to 200° C., preferably 130 to 170° C. and particularly 160° C., can optionally be carried out over a period of e.g. 20 to 40 min, preferably 20 min.

The glass printing ink and glass printing lacquer have good interlayer adhesion and can be stamped using hot-stamping foils.

The following examples explain the invention.

EXAMPLES

Example 1

A glass bottle was subjected to a UVitro pre-treatment (arcogas FTS 401 flame treatment equipment (Arcogas GmbH, Rotweg 25, D-71297 Mannheim):
Burner: MB3 100
1. Pre-flaming 300 l/min (air)-11 l/min (propane/butane)
2. UVitro 200 l/min (air)-7.5 l/min (propane/butane) duration: 3 to 4 seconds in each case
The bottles are then cooled to 35° to 40° C.
By means of dispersing on a triple roll or bead mill, a glass printing ink of the following composition was produced in advance:

| Component | Supplier | Quantity (wt. %) |
|---|---|---|
| 1,6-Hexanediol diacrylate | LAROMER* HDDA | 6.6 |
| Polysiloxane defoamer | Tego Airex 920*** | 0.5 |
|  | Tego Rad 2500**** | 0.5 |
| Photoinitiator 1 | DAROCURE 1173/1173C | 1 |
| Photoinitiator 2 | Lucirin TPO | 4.9 |
| Co-initiator | EBECRYL 7100***** | 4 |
| Pigment | TiO₂ | 27.5 |
| Micronised polytetrafluoroethylene wax | Lanco TF 1778****** | 3 |
| 50% solution of bisphenol A-based epoxy resin in Laromer HDDA | ARALDITE 7072 50% in Laromer HDDA | 52 |
|  |  | 100 |

*Laromer is a trade name of BASF
***Tego Airex 920 is a defoamer from Tego Chemie Service GmbH, Goldschmidtstraβe 11, D-45127 Essen
****Tego Rad 2500 is a flow control agent from Tego
*****Ebecryl 7100 is an amino-modified acrylate from Surface Specialities UCB
******Lanco TF 1778 is a PTFE wax from Noveon A mixture of the components listed in the above table was mixed with 4 wt. % diaminosilane (e.g. N-beta-(aminoethyl)-gamma-aminopropyltrimethoxysilane) or N-beta-(aminoethyl)-gamma-aminopropylmethyldimethoxysilane), or with 10 wt. % gamma-isocyanatopropyltriethoxysilane, and printed on to the treated glass bottle by means of a screen printing process on an ISIMAT 1000 P printing machine with a 120-34 screen fabric at 60 prints/min.

The printability is good.

The UV curing took place in a UV dryer at 600 mJ/cm$^3$ (measured with the UV MAP from EIT, Inc., 108 Carpenter Drive, Sterling, VA 20164).

The ink was not stoved.

Very good scratch resistance and adhesive strength were achieved in the undamaged ink film. The scratch resistance was determined using an Erichsen hardness test rod, model 318. A value of at least 5N, and in most cases a value of at least 7N, was determined.

Example 2

| Component | Supplier | Quantity (wt. %) |
|---|---|---|
| 1,6-Hexanediol diacrylate | LAROMER* HDDA | 6 |
| Stabiliser | FLORSTAB UV-2** | 1 |
| Polysiloxane defoamer | Tego Airex 920*** | 0.5 |
|  | Tego Rad 2500**** | 0.5 |
| Photoinitiator 1 | DAROCURE 1173/1173C | 1 |
| Photoinitiator 2 | Lucirin TPO | 4.9 |
| Co-initiator | EBECRYL 7100***** | 4 |
| Pigment | TiO$_2$ | 27.5 |
| Micronised polytetrafluoroethylene wax | Lanco TF 1778****** | 3.1 |
| 50% solution of bisphenol A-based epoxy resin in HDDA | ARALDITE 7072 50% in Laromer HDDA | 23 |
| Nanosilica in melamine acrylate | NANOCRYL XP 21/0793 | 10 |
| 35% MMA copolymer solution in Laromer HDDA | PARALOID B60, 35% in HDDA | 18.5 |
|  |  | 100 |

(Footnotes *, *, , * and **** see Example 1)
**FLORSTAB UV-2 is a stabiliser from Kromachem A mixture of the components listed in the above table was mixed with 4 wt. % diaminosilane (e.g. N-beta-(aminoethyl)-gamma-aminopropyltrimethoxysilane) or N-beta-(aminoethyl)-gamma-aminopropylmethyldimethoxysilane), or with 10 wt. % gamma-isocyanatopropyltriethoxysilane, and printed on to the treated glass bottle by means of a screen printing process on an ISIMAT 1000 P printing machine with a 120-34 screen fabric at 60 prints/min.

The printability is good.

The UV-curing took place in a UV dryer at approx. 600 mJ/cm$^2$ (see Example 1).

The ink was not stoved.

Very good scratch resistance and adhesive strength were achieved in the undamaged ink film. The scratch resistance was determined using an Erichsen hardness test rod, model 318. A value of at least 5N, and in most cases a value of at least 7N, was determined.

In a dishwasher test, it was possible to carry out over 1000 washing cycles in a Winterhalter industrial dishwasher and over 150 washing cycles in a Miele domestic dishwasher without any change to the printed image.

The printed bottles could be filled with fruit juice on a bottling line without damaging the ink film.

Example 3

A glass ink with the following composition

| Component | Trade name | Quantity (wt. %) |
|---|---|---|
| 1,6-Hexanediol diacrylate | LAROMER* HDDA | 2 |
| Stabiliser | FLORSTAB UV-2** | 1 |
| Polysiloxane defoamer | Tego Airex 920*** | 0.5 |
|  | Tego Rad 2500**** | 0.5 |
| Photoinitiator 1 | DAROCURE 1173/1173C | 1 |
| Photoinitiator 2 | Lucirin TPO | 4 |
| Co-initiator | EBECRYL 7100***** | 2.5 |
| Pigment | TiO$_2$ | 27.5 |
| Micronised polytetrafluoroethylene wax | Lanco TF 1778****** | 3.1 |
| Acid-modified polyester acrylate | GENOMER 7154 | 57.9 |
|  |  | 100 |

(Footnotes: see Examples 1 and 2)

is printed on to untreated flat glass in a screen printing process with a 140-34 screen fabric without using an adhesion promoter.

The UV-curing was carried out with a medium-pressure mercury lamp at 2×120 W/cm$^2$ at about 5 m/min.

A good crosshatch resistance (adhesion) was achieved without stoving. The scratch resistance is very good both in the undamaged and in the damaged film, and was determined with an Erichsen hardness testing rod, model 318, as at least 5N.

Example 4

A glass ink with the following composition

| Component | Trade name | Quantity (wt. %) |
|---|---|---|
| 1,6-Hexanediol diacrylate | LAROMER* HDDA | 6.6 |
| Polysiloxane defoamer | Tego Airex 920*** | 0.5 |
|  | Tego Rad 2500**** | 0.5 |
| Photoinitiator 1 | DAROCURE 1173/1173C | 1 |
| Photoinitiator 2 | Lucirin TPO | 4.9 |
| Co-initiator | EBECRYL 7100***** | 4 |
| Pigment | TiO$_2$ | 27.5 |
| Micronised polytetrafluoroethylene wax | Lanco TF 1778****** | 3 |
| 50% solution of bisphenol A-based epoxy resin in Laromer HDDA | ARALDITE 7072 50% in LAROMER HDDA | 23.5 |
| Acid-modified polyester acrylate | GENOMER 7154 | 28.5 |
|  |  | 100 |

(Footnotes: see Examples 1 and 2)

is printed on untreated flat glass in a screen printing process with a 140-34 screen fabric without using an adhesion promoter.

The UV-curing was carried out with a medium-pressure mercury lamp at 2×120 W/cm$^2$ at about 5 m/min.

A good crosshatch resistance (adhesion) was achieved without stoving. The scratch resistance is very good both in the undamaged and in the damaged film, and was determined with an Erichsen hardness testing rod, model 318, as at least 5N.

In a further test, the ink was then stoved for 20 min at 160° C.

The printing ink for glass then achieved a crosshatch value of Gt0 according to EN ISO 2409 immediately after the condensation water test.

With the glass printing ink of examples 1 and 2, therefore, good to very good scratch resistance and adhesion as well as water resistance properties of the resulting ink film were achieved in two-component printing without the need for stoving. With the glass printing inks of Examples 3 and 4, it was also possible to obtain good scratch resistance and adhesion properties in one-component printing without subsequent stoving and, with subsequent stoving for the glass printing ink of Example 4, in addition good water resistance properties of the resulting ink film. This means a simplification of the printing process compared with the printing processes of the prior art.

It is to be understood that the present invention may be embodied in other specific forms without departing from the spirit or central characteristics thereof. The present embodiments, therefore, are to be considered in all respects as illustrative and not restrictive, and the present invention is not to be limited to the details provided herein. While specific embodiments have been illustrated and described, numerous modification come to mind without significantly departing form the characteristics of the present invention and the scope of protection is only limited by the scope of the accompanying claims.

The invention claimed is:

1. A glass printing ink or glass printing lacquer comprising:
   at least one unmodified epoxy resin based on bisphenol A diluted in a UV-curing monomer,
   at least one photoinitiator wherein the at least one photoinitiator only comprises one or more radical initiators, and
   at least one additional substance,
   wherein the UV-curing monomer is a radically UV-curing monomer and,
   the at least one additional substance is a wax, and,
   wherein the bisphenol-A based epoxy resin is combined with a resin having functional groups including one or more of the following functional groups: free functional amino, hydroxy, epoxy, acid, acid anhydride and acrylate groups, and,
   wherein the resin with functional groups is a melamine acrylate, an acid-modified polyester acrylate, epoxy acrylate, or any combination thereof.

2. The glass printing ink or glass printing lacquer according to claim 1, wherein the wax includes at least one of the following: polyethylene wax, modified polyethylene wax, high density polyethylene wax, polymer-silica composite, micronized polyolefin wax, Fischer-Tropsch wax, micronised polytetrafluoroethylene wax, micronized polytetrafluoroethylene/polyethylene wax, amide wax, carnauba wax, montan wax, micronized ester wax with UV-reactive groups, paraffin wax, polypropylene wax, and spray-micronised polyolefin wax.

3. The glass printing ink or glass printing lacquer according to claim 1, wherein the wax is used in a quantity of substantially 0.1 wt. % to 10.0 wt. % dry weight, based on the weight of the glass printing ink or glass printing lacquer.

4. The glass printing ink or glass printing lacquer according to claim 3, wherein the wax is used in a quantity of substantially 0.5 wt. % to 5.0 wt. % dry weight, based on the weight of the glass printing ink or glass printing lacquer.

5. The glass printing ink or glass printing lacquer according to claim 4, wherein the wax is used in a quantity of substantially 1.0 wt. % to 3.0 wt. % dry weight, based on the weight of the glass printing ink or glass printing lacquer.

6. The glass printing ink or glass printing lacquer according to claim 1, wherein the wax is dispersed in the glass printing ink or glass printing lacquer.

7. The glass printing ink or glass printing lacquer according to claim 1, wherein the bisphenol A-based epoxy resin has a weight-average molecular weight in the range of substantially 700 to 1500.

8. The glass printing ink or glass printing lacquer according to claim 1, wherein the at least one photoinitiator is present in a total quantity of substantially 1 to 12 wt. %. based on the weight of the glass printing ink or glass printing lacquer.

9. The glass printing ink or glass printing lacquer according to claim 1, wherein the radically UV-curing monomer is hexanediol diacrylate.

10. The glass printing ink or glass printing lacquer according to claim 1, further comprising a stabiliser.

11. The glass printing ink or glass printing lacquer according to claim 1, further comprising a co-initiator.

12. The glass printing ink or glass printing lacquer according to claim 1, further comprising one or more pigments or dyes in a quantity of substantially 0.5 to 50 wt. %, based on the total weight of the ink.

* * * * *